United States Patent
Ito

(10) Patent No.: US 8,963,468 B2
(45) Date of Patent: Feb. 24, 2015

(54) MOTOR CONTROL DEVICE AND ELECTRIC POWER STEERING DEVICE

(75) Inventor: Takehiro Ito, Kuwana-gun (JP)

(73) Assignee: JTEKT Corporation, Osaka (JP)

( * ) Notice: Subject to any disclaimer, the term of this patent is extended or adjusted under 35 U.S.C. 154(b) by 92 days.

(21) Appl. No.: 13/976,259

(22) PCT Filed: Jan. 6, 2012

(86) PCT No.: PCT/JP2012/050144
§ 371 (c)(1),
(2), (4) Date: Jun. 26, 2013

(87) PCT Pub. No.: WO2012/093711
PCT Pub. Date: Jul. 12, 2012

(65) Prior Publication Data
US 2013/0278198 A1    Oct. 24, 2013

(30) Foreign Application Priority Data
Jan. 6, 2011   (JP) .................. 2011-001203

(51) Int. Cl.
  *H02K 11/00*   (2006.01)
  *B62D 5/04*    (2006.01)
  *H02M 1/32*    (2007.01)
  *H02P 27/08*   (2006.01)
  *H02P 29/02*   (2006.01)

(52) U.S. Cl.
  CPC .............. *H02K 11/001* (2013.01); *B62D 5/049* (2013.01); *H02M 1/32* (2013.01); *H02P 27/08* (2013.01); *H02P 29/021* (2013.01)
  USPC ............................ 318/490; 318/599; 318/560

(58) Field of Classification Search
  CPC .................................................. H02K 11/001
  USPC ........................................ 318/490, 599, 560
  See application file for complete search history.

(56) References Cited

U.S. PATENT DOCUMENTS

| | | | |
|---|---|---|---|
| 6,121,736 A * | 9/2000 | Narazaki et al. | 318/400.35 |
| 6,388,416 B1 * | 5/2002 | Nakatani et al. | 318/700 |
| 2007/0176577 A1 | 8/2007 | Kezobo et al. | |
| 2008/0203963 A1 | 8/2008 | Suzuki | |

FOREIGN PATENT DOCUMENTS

| | | |
|---|---|---|
| JP | A-2003-324985 | 11/2003 |
| JP | A-2005-269880 | 9/2005 |
| JP | A-2008-211909 | 9/2008 |

(Continued)

OTHER PUBLICATIONS

Mar. 27, 2012 International Search Report issued in International Patent Application No. PCT/JP2012/050144.

*Primary Examiner* — David S Luo
(74) *Attorney, Agent, or Firm* — Oliff PLC

(57) ABSTRACT

A motor control device includes an anomaly detection means that detects an anomaly occurring on power feeding paths of respective phases on the basis of first electric current values, second electric current values of the respective phases and a phase electric current value obtained by the first electric current values and the second electric current values. When at least one of an absolute value of the first electric current value and an absolute value of the second electric current value exceeds a first threshold value corresponding to a limit value of an electric current detection and an absolute value of the phase electric current value is smaller than a second threshold value corresponding to zero in any one phase, the anomaly detection means determines that an anomaly of an electric current sensor has occurred as regards the corresponding phase.

4 Claims, 9 Drawing Sheets

(56) References Cited

FOREIGN PATENT DOCUMENTS

| JP | A-2008-295122 | 12/2008 |
| JP | A-2010-28984 | 2/2010 |
| WO | WO 2005/091488 A1 | 9/2005 |

* cited by examiner

*Fig. 7A*  UPON UPPER END FET SHORT
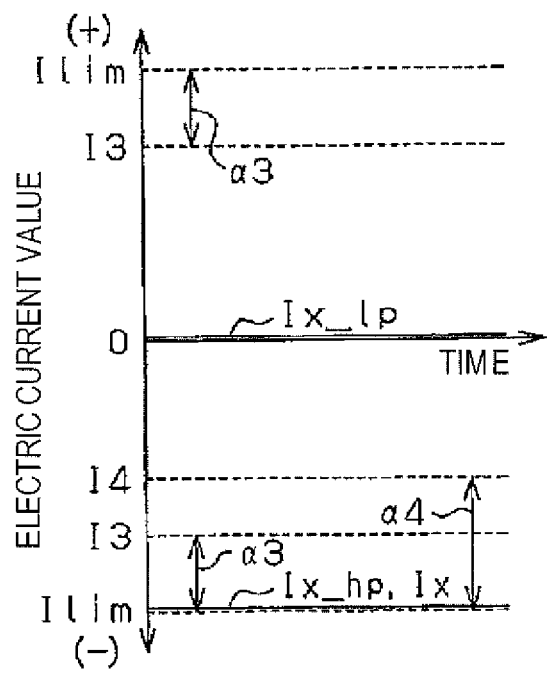
*Fig. 7B*  UPON LOWER END FET SHORT
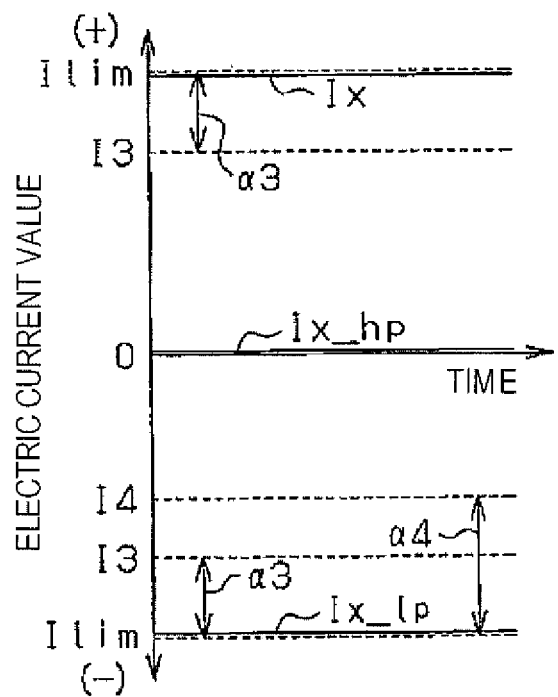

MOTOR CONTROL DEVICE AND ELECTRIC POWER STEERING DEVICE

TECHNICAL FIELD

The invention relates to a motor control device and an electric power steering device.

BACKGROUND ART

In recent years, an electric power steering device (EPS) having a motor as a driving source has a need for continuing to drive the motor insomuch as safety is secured, even when a system has any anomaly. That is, even when the anomaly occurs, an increase in a steering force is suppressed to reduce a driver's burden, so that a vehicle is retreated more safely or is traveled to a facility (for example, dealer or repair shop) for removing the anomaly having occurred.

Thus, it is determined whether an electric conduction defect, which is caused by a break of a power feeding line or a contact failure (open anomaly of each switching element) of a drive circuit, for example, occurs in any one of respective phases (U, V, W) of the motor. When the electric conduction defect occurs in only one phase, the motor driving is continued while using the two phases except for the electric conduction defective phase as an electric conductive phase (for example, refer to Patent Documents 1 and 2).

That is, even when the electric conduction defect occurs in any one phase, the safe electric conduction can be made for the phases other than the electric conduction defective phase, like usual times. Hence, according to the above configuration, it is possible to continue the motor driving and to thus apply an assist force to a steering system while securing the safety.

CITATION LIST

Patent Documents

[Patent Document 1] WO 2005/091488
[Patent Document 2] JP-A-2008-211909

SUMMARY OF INVENTION

Technical Problem

In addition to the electric conduction defect, there is an anomaly of an electric current sensor (sensor anomaly), as an anomaly mode where continuous control by two-phase driving can be executed. That is, when an anomaly (for example, a failure of an amplifier) occurs in an electric current sensor that is provided in correspondence to each phase, an output level thereof may be abnormal (for example, the output level is fixed in the vicinity of a limit value (upper limit or lower limit) of an electric current detection (so-called, Hi/Lo stiction)). In this case, when all actual power feeding paths are normal and the anomaly having occurred is only the sensor anomaly, the motor driving can be safely continued insomuch as only the two phases other than the phase with the anomaly are used as the electric conductive phase.

However, the anomaly mode that is detected based on a sensor signal indicating the occurrence of the over-current includes not only the above sensor anomaly but also a short anomaly (short) of each switching configuring the drive circuit. When the short anomaly occurs, a through-electric current is generated in the phase with the anomaly and the drive circuit cannot be normally operated. Therefore, when the sensor signal indicates that the over-current has occurred, the continuous control by the two-phase driving is not performed, which is also a problem to be solved.

The invention has been made to solve the above problems and an object of the invention is to provide a motor control device and an electric power steering device capable of detecting whether a sensor anomaly has occurred with good precision while distinguishing the sensor anomaly with a short anomaly having occurred in each switching element configuring a drive circuit.

Solution to Problem

In order to solve the above problems, the invention provides a motor control device including an electric current detection means that detects phase electric current values of three phases to be electrically conducted to a motor, a motor control signal output means that outputs a motor control signal by executing electric current control, in which a triangular wave is a PWM carrier, based on the respective phase electric current values, and a drive circuit that outputs drive power to the motor, based on the motor control signal wherein the drive circuit is configured by parallel connecting switching arms in correspondence to the respective phases, each of the switching arms having a pair of switching elements turning on/off on the basis of the motor control signal and connected in series with each other, wherein electric current sensors are provided to low-voltage sides of the respective switching arms, wherein the electric current detection means detects first electric current values of the respective phases by acquiring output signals of the respective electric current sensors at timing at which the triangular wave becomes a peak, detects second electric current values of the respective phases by acquiring output signals of the respective electric current sensors at timing at which the triangular wave becomes a bottom and detects phase electric current values of the respective phases based on differences of the respective first electric current values and the respective second electric current values, wherein an anomaly detection means that detects an anomaly occurring on power feeding paths of the respective phases on the basis of the first electric current values, the second electric current values and the phase electric current values is provided, and wherein when at least one of an absolute value of the first electric current value and an absolute value of the second electric current value exceeds a first threshold value corresponding to a limit value of the electric current detection and an absolute value of the phase electric current value is smaller than a second threshold value corresponding to zero in any one phase, the anomaly detection means determines that an anomaly of the electric current sensor has occurred as regards the corresponding phase.

That is, when an anomaly occurs in the electric current sensors of the respective phases, both the first electric current value and second electric current value of the phase with the anomaly may become constant as values in the vicinity of a limit value of the electric current detection. In this case, a phase electric current value, which is a difference of two values, is also constant as a value in the vicinity of "0". Therefore, according to the above configuration, it is possible to detect whether the sensor anomaly has occurred in each phase with good precision.

Preferably, when the anomaly of the electric current sensor has occurred, the motor control signal output means outputs the motor control signal in which two phases other than the phase with the anomaly are used as an electric conductive phase. According to this configuration, it is possible to enlarge an execution area of continuous control by two-phase driving while securing the safety.

Preferably, when the absolute value of the phase electric current value exceeds a third threshold value corresponding to the limit value and the first electric current value or second electric current value is smaller than a fourth threshold value corresponding to a lower limit value of the electric current detection, the anomaly detection means determines that a short anomaly of the switching element has occurred as regards the corresponding phase.

That is, when the respective electric current sensors are provided at low-voltage sides of the respective switching arms, if the short anomaly occurs in any one switching element, the first electric current value (upon an upper end short) or second electric current value (upon an lower end short) indicates a value in the vicinity of the lower limit value of the electric current detection.

Therefore, according to the above configuration, it is possible to detect whether the short anomaly has occurred in each phase with good precision. Based on the detection result, it is possible to stop the motor control and to rapidly seek the fail safe. As a result, it is possible to further improve the safety.

Also, an electric power steering device of the invention is an electric power steering device having the above-described motor control device.
According to the above configuration, it is possible to detect whether the sensor anomaly has occurred with good precision. As a result, it is possible to enlarge an execution area of the continuous control by the two-phase driving while securing the safety. Even when the sensor anomaly occurs, it is possible to continuously apply an assist force to a steering system and to thus suppress an increase in a steering force, thereby reducing the driver's burden.

Advantageous Effects of Invention

According to the invention, it is possible to provide a motor control device and an electric power steering device capable of detecting whether a sensor anomaly has occurred with good precision while distinguishing the sensor anomaly with a short anomaly having occurred in each switching element configuring a drive circuit.

BRIEF DESCRIPTION OF DRAWINGS

FIGS. 7A and 7B illustrate each phase electric current value, each first electric current value and each second electric current value upon occurrence of a short anomaly.

DESCRIPTION OF EMBODIMENTS

Hereinafter, an illustrative embodiment implementing the invention will be described with reference to the drawings.

Figure 1:
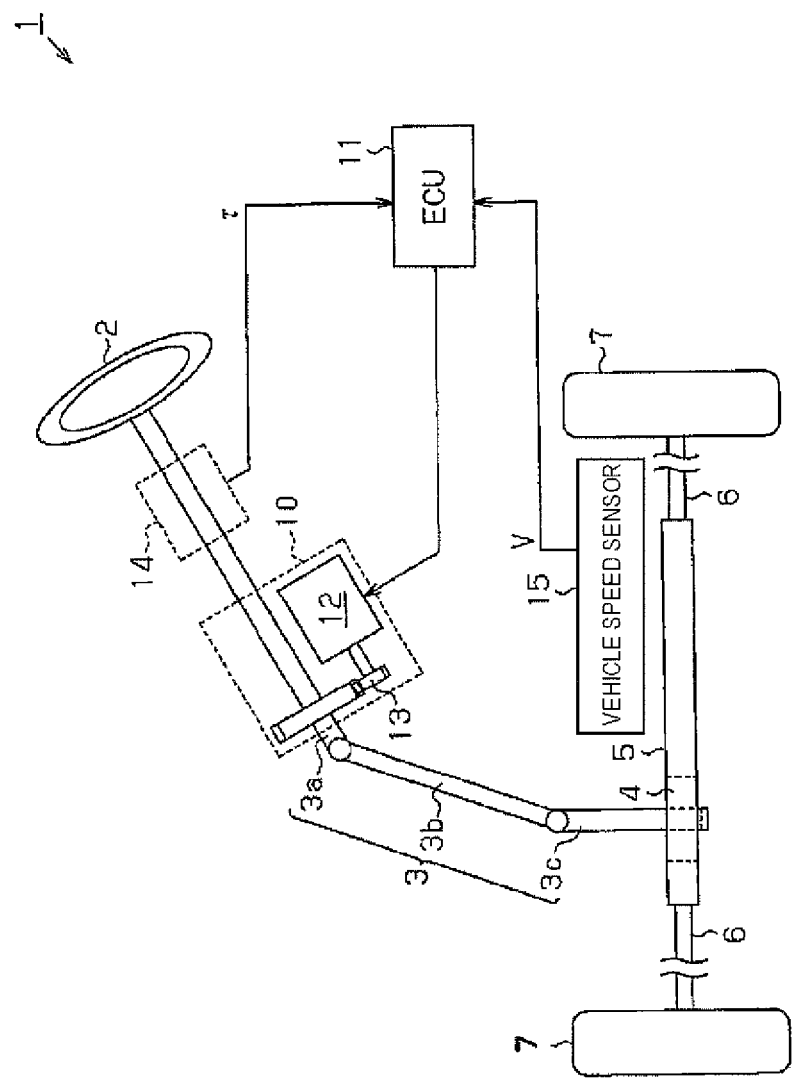
FIG. 1 is a schematic configuration view of an electric power steering device (EPS).

As shown in FIG. 1, in an electric power steering device (EPS) 1 of this illustrative embodiment, a steering shaft 3 having a steering 2 fixed thereto is coupled to a rack shaft 5 via a rack and pinion mechanism 4, and rotation of the steering shaft 3 accompanied by a steering operation is converted into reciprocal linear motion of the rack shaft 5 by the rack and pinion mechanism 4. Also, the steering shaft 3 of this illustrative embodiment has a column shaft 3a, an intermediate shaft 3b and a pinion shaft 3c, which are coupled. The reciprocal linear motion of the rack shaft 5 accompanied by the rotation of the steering shaft 3 is transmitted to knuckles (not shown) through tie rods 6 coupled to both ends of the rack shaft 5, so that a steering angle of steering road wheels 7, i.e., a traveling direction of a vehicle is changed.

Also, the EPS 1 has an EPS actuator 10 serving as a steering force auxiliary device that provides a steering system with an assist force for assisting a steering operation and an ECU 11 serving as a control means that controls an operation of the EPS actuator 10.

In this illustrative embodiment, the EPS actuator 10 is configured as a so-called column type EPS actuator in which a motor 12 serving as a driving source is drive-coupled to the column shaft 3a via a deceleration mechanism 13. Also, the motor 12 of this illustrative embodiment adopts a brushless motor. The motor 12 is rotated as drive power of three phases (U, V, W) is fed thereto from the ECU 11. The EPS actuator 10 is configured to decelerate the rotation of the motor 12 and to transmit the same to the column shaft 3a, thereby applying motor torque thereof to the steering system as the assist force.

In the meantime, the ECU 11 is connected with a torque sensor 14 and a vehicle speed sensor 15. The ECU 11 detects steering torque t and vehicle speed V, based on output signals from the respective sensors. The ECU 11 calculates a target assist force, based on the steering torque t and vehicle speed V, and controls the operation of the EPS actuator 10, i.e., the assist force to be applied to the steering system by feeding the drive power to the motor 12 serving as the driving source so as to generate the target assist force for the EPS actuator 10 (power assist control).

Subsequently, an electrical configuration of the EPS of this illustrative embodiment is described.

Figure 2:
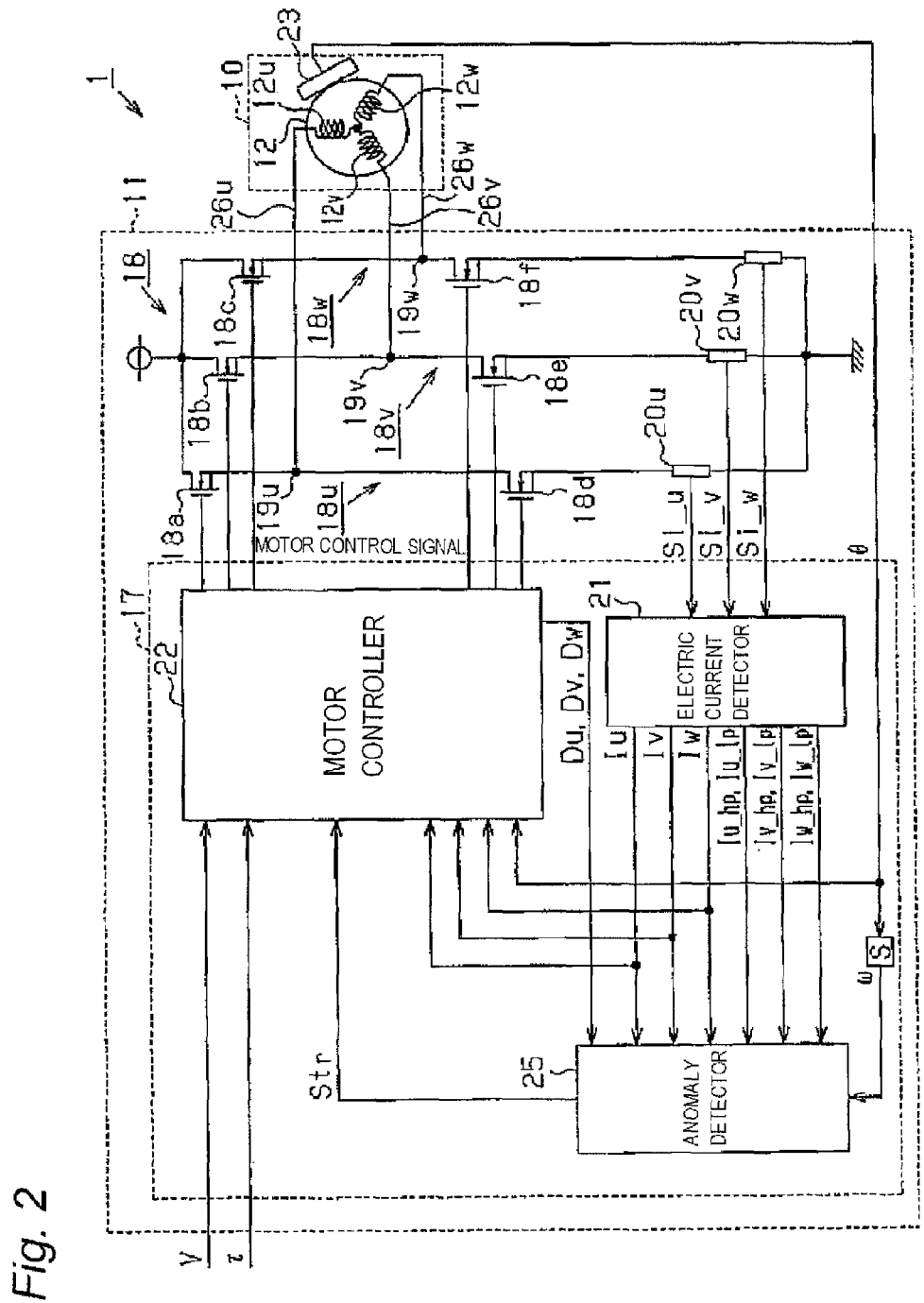
FIG. 2 is a block diagram showing an electrical configuration of the EPS.

FIG. 2 is a control block diagram of the EPS of this illustrative embodiment. As shown in FIG. 2, the ECU 11 has a microcomputer 17 that outputs a motor control signal and a drive circuit 18 that feeds three-phase drive power to the motor 12, based on the motor control signal output from the microcomputer 17.

In this illustrative embodiment, the drive circuit 18 is configured by parallel connecting series circuits of respective sets of FETs 18a, 18d, FETs 18b, 18e and FETs 18c, 18f. Respective connection points 19u, 19v, 19w of the FETs 18a, 18d, FETs 18b, 18e and FETs 18c, 18f are connected to motor coils 12u, 12v, 12w of respective phases of the motor 12, respectively.

That is, the drive circuit 18 of this illustrative embodiment is configured by a well-known PWM inverter in which three switching arms 18u, 18v, 18w, each of which has, as a basic unit (switching arm), a pair of switching elements connected in series and corresponds to each phase, are connected in parallel. The motor control signal that is output from the microcomputer 17 is a gate on/off signal that defines a switching state (on/off operation) of each FET 18a to 18f configuring the drive circuit 18.

That is, each FET 18a to 18f configuring the drive circuit 18 becomes on/off as a control voltage based on the motor control signal is applied to a gate terminal thereof. Then, a pattern of the motor coils 12u, 12v, 12w of the respective phases is switched, so that the three-phase drive power is fed to the motor 12.

Figure 3:
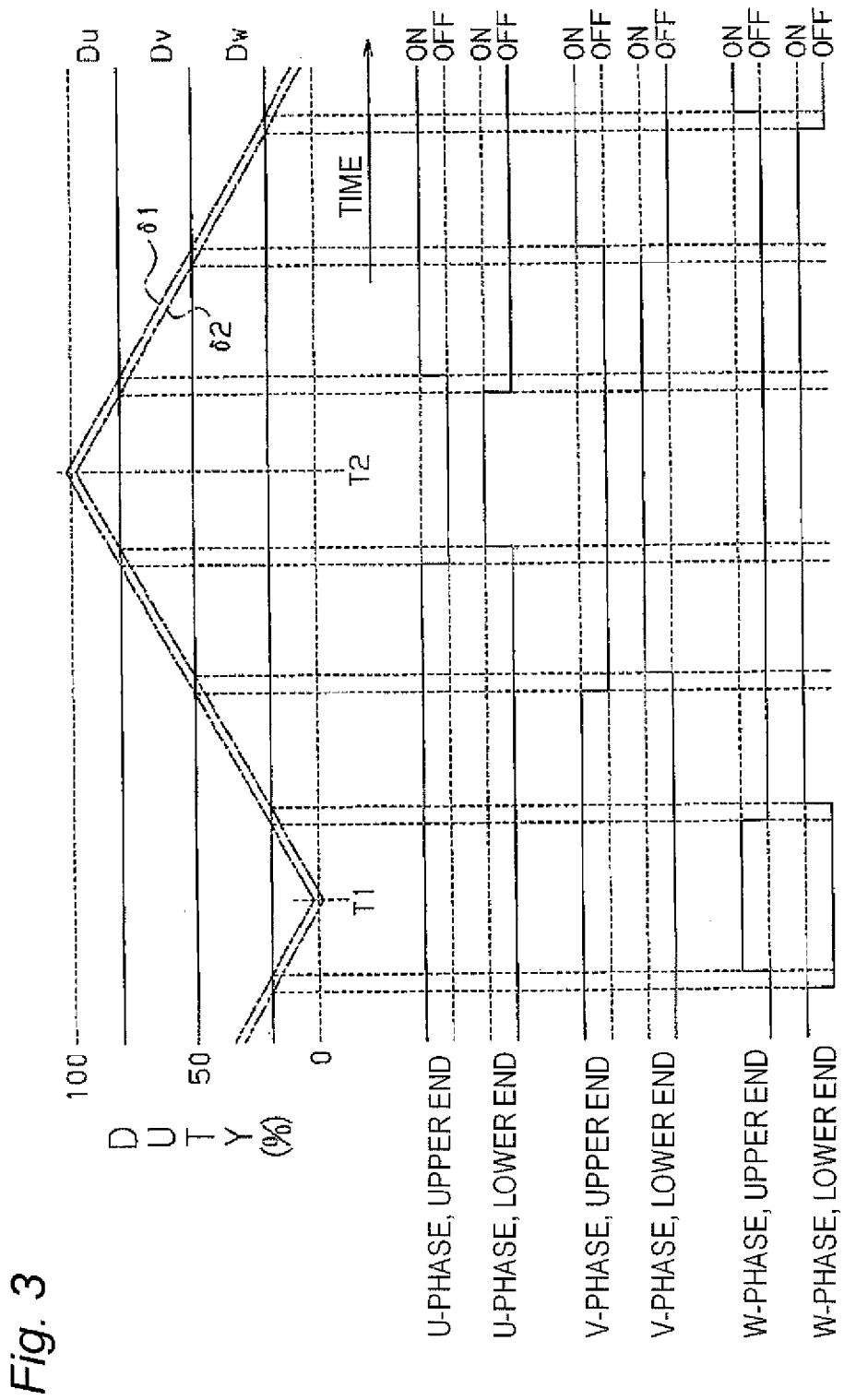
FIG. 3 illustrates an aspect of electric current control in which a triangular wave is used as a PWM carrier.

Specifically, as shown in FIG. 3, the microcomputer 17 of this illustrative embodiment generates the motor control signal, which is output to the drive circuit 18, based on a comparison of respective DUTY indication values Du, Dv, Dw, which correspond to phase voltages to be applied to the motor coils 12u, 12v, 12w of respective phases, with a triangular wave that is a PWM carrier (carrier wave). In this illustrative embodiment, two equivalent triangular waves δ1, δ2 (δ1>δ2) of vertically shifted phases are used, so that dead time is set so as to prevent through-electric current from occurring due to a so-called arm short.

That is, regarding the comparison with the triangular wave δ1 that is positioned at the upper in FIG. 3, when each of the DUTY indication values Du, Dv, Dw is larger than a value of the triangular wave δ1, the microcomputer 17 generates a motor control signal that turns on each of the FETs 18a, 18b, 18c of a high-voltage side (upper end) corresponding to the relevant phase, and when each of the DUTY indication values is smaller, the microcomputer 17 generates a motor control signal that turns off each of the FETs 18a, 18b, 18c. Also, regarding the comparison with the triangular wave δ2 that is positioned at the lower in FIG. 3, when each of the DUTY indication values Du, Dv, Dw is smaller than a value of the triangular wave δ1, the microcomputer 17 generates a motor control signal that turns on each of the FETs 18d, 18e, 18f of a low-voltage side (lower end) corresponding to the relevant phase, and when each of the DUTY indication values is larger, the microcomputer 17 generates a motor control signal that turns off each of the FETs 18d, 18e, 18f.

Also, as shown in FIG. 2, in this illustrative embodiment, low voltage-sides (ground-sides, i.e., the lower in FIG. 2) of the respective switching arms 18u, 18v, 18w configuring the drive circuit 18 are respectively provided with electric current sensors 20u, 20v, 20w corresponding to the respective phases. Also, each of the electric current sensors 20u, 20v, 20w has a well-known configuration that amplifies and outputs a voltage between terminals of a shunt resistance connected in series with each of the switching arms 18u, 18v, 18w. In this illustrative embodiment, the microcomputer 17 detects respective phase electric current values Iu, Iv, Iw that are enabled to flow through the motor 12, based on output signals Si_u, Si_v, Si_w of the respective electric current sensors 20u, 20v, 20w.

Specifically, an electric current detector 21 provided to the microcomputer 17 acquires output signals Si_u, Si_v, Si_w of the respective electric current sensors 20u, 20v, 20w at predetermined sampling timings. Specifically, as shown in FIG. 3, the electric current detector acquires output signals Si_u, Si_v, Si_w of the respective electric current sensors 20u, 20v, 20w at timing (T1 in FIG. 3) at which the triangular wave (δ1, δ2), which is a PWM carrier, becomes a "bottom (minimum value)" and at timing (T2 in FIG. 3) at which the triangular wave becomes a "peak (maximum value)". Also, in this case, the "timing at which the triangular wave becomes a peak" and the "timing at which the triangular wave becomes a bottom" are peak timings at which values of the triangular wave (δ1, δ2) become "maximum" and "minimum", respectively. Then, the electric current detector 21 detects respective phase electric current values Iu, Iv, Iw of the motor 12, based on the output signals Si_u, Si_v, Si_w acquired at the two timings.

Figure 4:
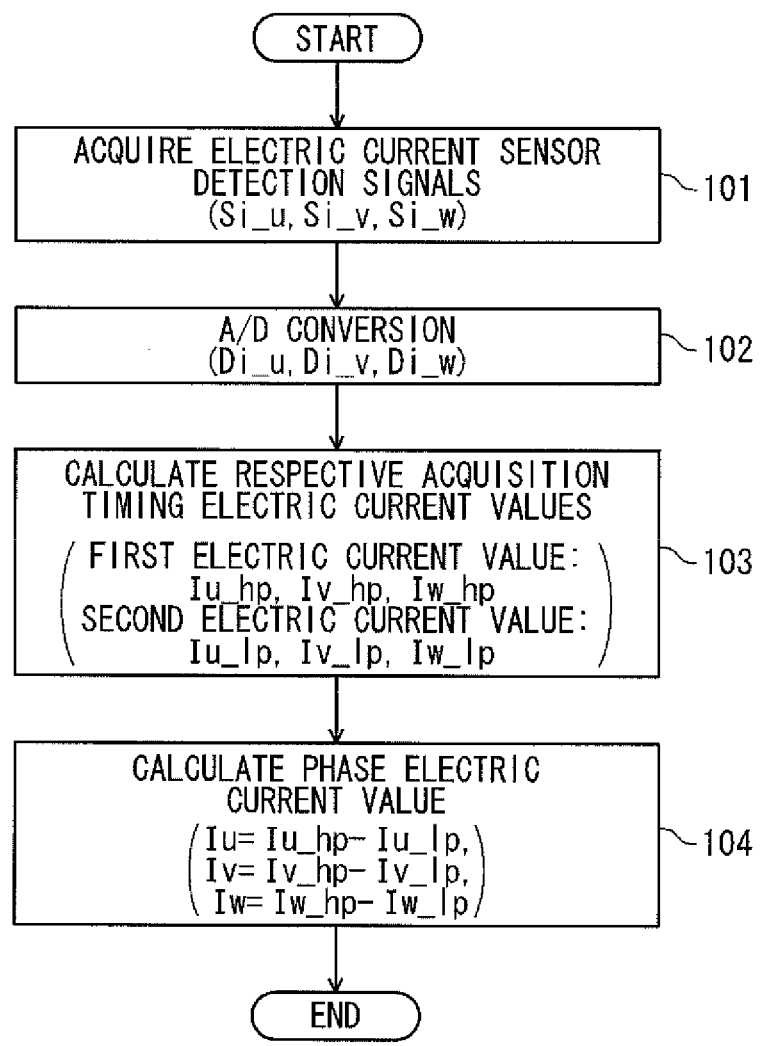
FIG. 4 is a flowchart showing a processing procedure of electric current detection.

Specifically, as shown in a flowchart of FIG. 4, when the electric current detector 21, which is the electric current detection means, acquires the output signals Si_u, Si_v, Si_w of the respective electric current sensors 20u, 20v, 20w at the respective sampling timings (step 101), it A/D converts the respective output signals Si_u, Si_v, Si_w (step 102). Then, the electric current detector detects first electric current values Iu_hp, Iv_hp, Iw_hp corresponding to the sampling timing at which the triangular wave (δ1, δ2), which is a PWM carrier, becomes a "peak (maximum value)" and second electric current values Iu_lp, Iv_lp, Iw_lp corresponding to the sampling timing at which the triangular wave (δ1, δ2), which is a PWM carrier, becomes a "bottom (minimum value)", based on the A/D converted values Di_u, Di_v, Di_w (step 103).

Then, the electric current detector 21 subtracts the second electric current values Iu_lp, Iv_lp, Iw_lp from the first electric current values Iu_hp, Iv_hp, Iw_hp of the respective phases, which are detected at the two continuous sampling timings (refer to FIG. 2, T1, T2). Then, the electric current detector detects the obtained values, as the phase electric current values Iu, Iv, Iw of the respective phases (Iu=Iu_hp–Iu_lp, Iv=Iv_hp–Iv_lp, Iw=Iw_hp–Iw_lp, step 104).

As shown in FIG. 2, in the microcomputer 21 of this illustrative embodiment, the respective phase electric current values Iu, Iv, Iw detected by the electric current detector 21 are input to a motor controller 22, which is the motor control signal output means, together with the steering torque τ and vehicle speed V. Also, the motor controller 22 is input with a motor rotation angle θ detected by a motor resolver 23. As the motor controller 22 executes current control based on the respective state quantities, the microcomputer 17 generates the motor control signal that is output to the drive circuit 18.

Specifically, the motor controller 22 calculates an electric current command value corresponding to an assist force (target assist force) so as to apply the same to the steering system, based on the steering torque τ and the vehicle speed V. Specifically, the larger the steering torque τ and the slower the vehicle speed V, which are detected, the motor controller calculates an electric current command value generating the higher assist force. Then, the motor controller 22 executes electric current feedback control to thus generate a motor control signal so that an actual electric current value follows the electric current command value.

Specifically, the motor controller 22 of this illustrative embodiment converts the respective phase electric current values Iu, Iv, Iw, which are detected as the actual electric current values, into d-axis and q-axis electric current values of a d/q coordinate system, based on the motor rotation angle θ. Also, the motor controller 22 calculates a q-axis electric current command value, as the electric current command value (a d-axis electric current command value is zero). Then, the motor controller executes electric current feedback control calculation so that the respective axis electric current values follow the respective axis electric current command values in the d/q coordinate system, and performs reverse conversion (twp-phase/three-phase conversion) for a resultant voltage command values of the d/q coordinate system, thereby calculating respective phase voltage command values of the three-phase coordinate system (U, V, W).

Also, the motor controller 22 compares the respective DUTY indication values Du, Dv, Dw based on the respective phase voltage command values calculated as described above with the triangular wave (δ1, δ2), which is the PWM carrier, thereby generating the motor control signal, as described above. In this illustrative embodiment, the microcomputer 17 outputs the motor control signal to the drive circuit 18. Thereby, the drive power for generating the target assist force is fed to the motor 12 that is a driving source of the EPS actuator 10.

Also, as shown in FIG. 2, the microcomputer 17 of this illustrative embodiment is provided with an anomaly detector 25 that detects an anomaly occurring on a power feeding path between the drive circuit 18 and the motor 12. Specifically, the anomaly detector 25 that is the anomaly detection means is input with the phase electric current values Iu, Iv, Iw of the respective phases detected by the electric current detector 21, the respective DUTY indication values Du, Dv, Dw calculated by the motor controller 22 and a motor rotation angular speed ω. Then, the anomaly detector 25 detects an electric conduction defect occurring on the electric current supply path of each phase, based on the respective state quantities.

In this illustrative embodiment, a detection result of the anomaly detector 25 is input to the motor controller 22, as an anomaly detection signal Str. When the anomaly detection signal Str indicates that an electric conduction defect has occurred and the electric conduction defect occurs in only one phase, the motor controller 25 executes the generation of the motor control signal so as to continuously feed the drive power to the motor 12 while using the two phases except for the electric conduction defective phase as an electric conductive phase.

Also, the electric conduction defect may be caused due to open (open is fixed) anomaly of the respective FETs 18a to 18f configuring the drive circuit 18, a break of power feeding lines 26u, 26v, 26w connecting the drive circuit 18 and the motor coils 12u, 12v, 12w of the respective phases, and the like. The details of the electric conduction defect detection based on the respective state quantities (phase electric current values, DUTY indication values and motor rotation angular speed) and the continuous control (two-phase driving) of using the two phases except for the electric conduction defective phase as an electric conductive phase may be referred to Patent 1 or 2, for example.

Also, the anomaly detector 25 of this illustrative embodiment is input with the first electric current values Iu_hp, Iv_hp, Iw_hp and second electric current values Iu_lp, Iv_lp, Iw_lp of the respective phases detected by the electric current detector 21, together with the respective state quantities. Then, the anomaly detector 25 detects an anomaly (sensor anomaly) of the respective electric current sensors 20u, 20v, 20w and a short anomaly having occurred in the respective FETs 18a to 18f configuring the drive circuit 18, based on the first electric current values Iu_hp, Iv_hp, Iw_hp and second electric current values Iu_lp, Iv_lp, Iw_lp of the respective phases and the phase electric current values Iu, Iv, Iw of the respective phases.

Figure 5:
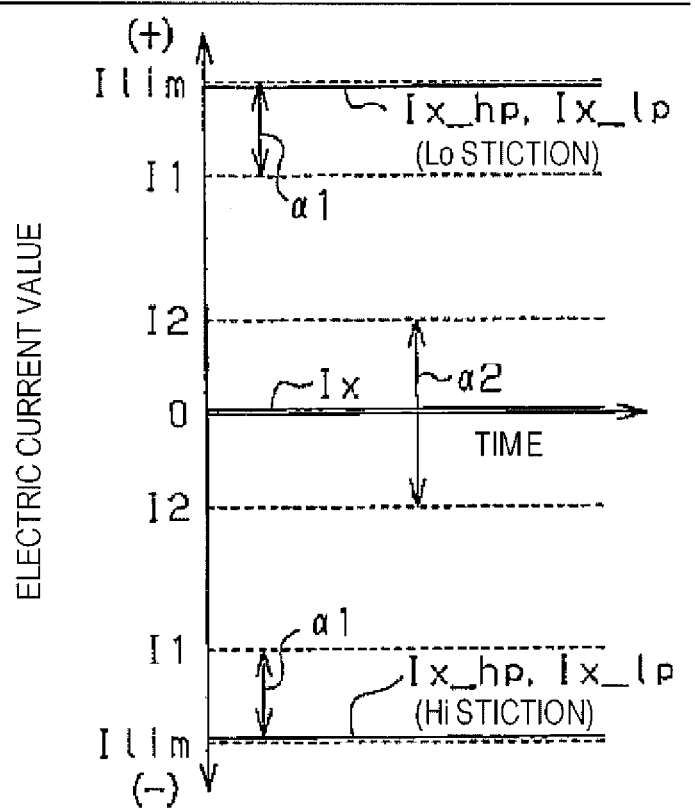
FIG. 5 illustrates each phase electric current value, each first electric current value and each second electric current value upon occurrence of an electric current sensor anomaly.

That is, when an anomaly (for example, a failure of an amplifier) occurs in the electric current sensors 20u, 20v, 20w of the respective phases, values of the output signals Si_u, Si_v, Si_w may be constant (so-called Hi/Lo stiction) in the vicinity of the output limit. In this case, as shown in FIG. 5, both the first electric current value Ix_hp and second electric current value Ix_lp (x=u, v, w) of the phase with the anomaly detected by the electric current detector 21 become constant as values in the vicinity (area α1 in FIG. 5) of a limit value (±Ilim) of the electric current detection. As a result, a phase electric current value Ix, which is a difference of two values, is also constant as a value in the vicinity (area α2 in FIG. 5) of "0".

Noticing the above point, the anomaly detector 25 of this illustrative embodiment determines whether at least one of absolute values of the first electric current values Iu_hp, Iv_hp, Iw_hp and absolute values of the second electric current values Iu_lp, Iv_lp, Iw_lp exceeds a first threshold value I1 that is set in correspondence to the limit value (±Ilim) of the electric current detection. Also, the anomaly detector 25 detects whether absolute values of the respective detected phase electric current values Iu, Iv, Iw are smaller than a second threshold value I2 that is set in correspondence to "0 (zero)". When there is a phase that fulfils both the two determination conditions, the anomaly detector determines that the sensor anomaly (stiction) as described above has occurred in the corresponding phase.

Figure 6:
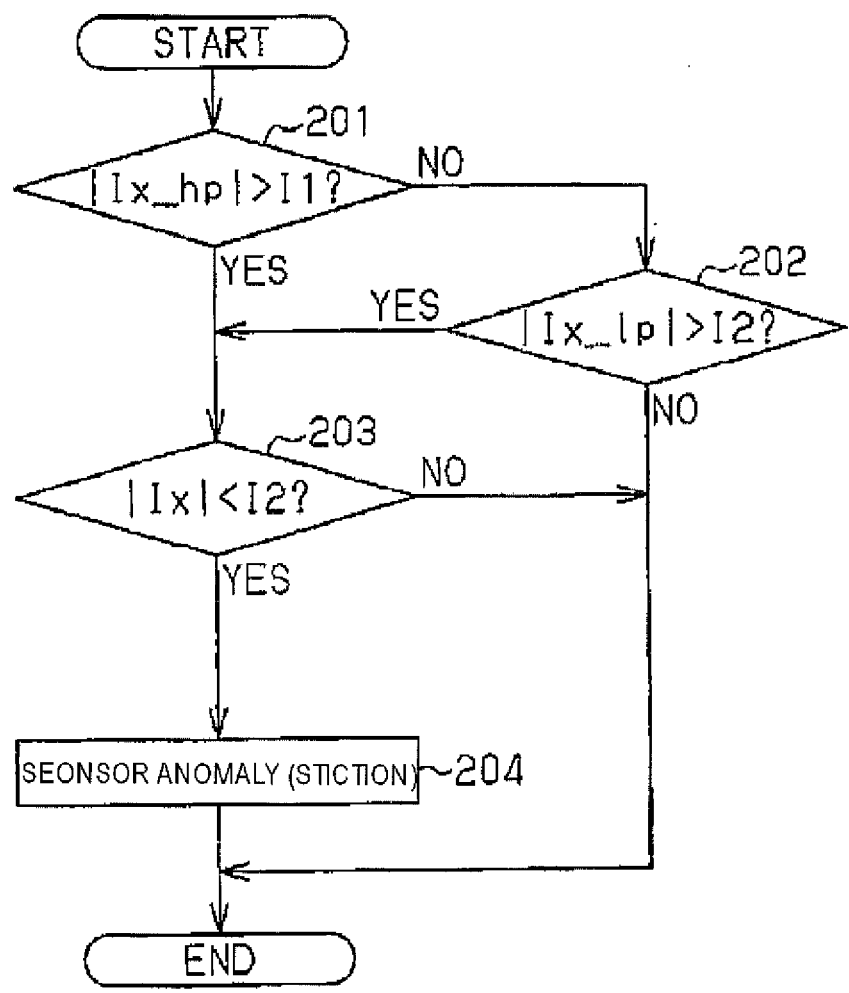
FIG. 6 is a flowchart showing a processing procedure of sensor anomaly detection.

Specifically, as shown in a flowchart of FIG. 6, the anomaly detector 25 of this illustrative embodiment first determines whether an absolute value (|Ix_hp|) of the first electric current value Ix_hp of the X phase (X=U, V, W), which is a determination target, exceeds the first threshold value I1 (step 201). Then, when the absolute value of the first electric current value Ix_hp is equal to or smaller than the first threshold value ((|Ix_hp|)≤I1, step 201: NO), the anomaly detector continuously determines whether an absolute value (|Ix_lp|) of the second electric current value Ix_lp of the X phase exceeds the first threshold value I1 (step 202).

Then, when it is determined in step 201 that the absolute value of the first electric current value Ix_hp exceeds the first threshold value ((|Ix_hp|)>I1, step 201: YES), the anomaly detector 25 determines whether the absolute value of the phase electric current value Ix of the X phase is smaller than the second threshold value I2 (step 203). Also, when it is determined in step 202 that the absolute value of the second electric current value Ix_lp exceeds the first threshold value I1 (|Ix_lp|)>I1, step 202: YES), the anomaly detector also determines in step 203 whether the absolute value of the phase electric current value Ix of the X phase is smaller than the second threshold value I2. When the absolute value of the phase electric current value Ix is smaller than the second threshold value I2 (|Ix|)<I2, step 203: YES), the anomaly detector determines that a sensor anomaly (stiction) has occurred in the X phase (step 204).

Also, when it is determined in step 202 that the absolute value of the second electric current value Ix_lp is equal to or smaller than the first threshold value (|Ix_lp|≤I1, step 202: NO), the anomaly detector 25 does not execute the processing of steps 203 and 204. When it is determined in step 203 that the absolute value of the phase electric current value Ix is equal to or larger than the second threshold value I2 (|Ix|≤I2, step 203: NO), the anomaly detector does not execute the processing of step 204.

In the meantime, as shown in FIGS. 7A and 7B, when a short failure occurs in any one of the respective FETs 18a to 18f configuring the drive circuit 18, the phase electric current value Ix of the phase with the short anomaly indicates a value in the vicinity (area α3 in FIG. 7) of the limit value (±Ilim) of the electric current detection because a through-electric current due to the so-called arm short is generated.

Specifically, as shown in FIG. 7A, when the short anomaly occurs in any one of the respective FETs 18a, 18b, 18c of the high-voltage side (power supply-side, upper end) of the drive circuit 18, the through-electric current having a value in the vicinity (area α4 in FIG. 7A) of the lower limit value (−Ilim) of the electric current detection is detected as the first electric current value Ix_hp of the phase with the anomaly detected by the electric current detector 21. The second electric current value Ix_lp is substantially "0 (zero)", like usual times. Hence, in this case, the phase electric current value Ix that is a difference between the two values indicates a value that is substantially the same as the first electric current value Ix_hp in the vicinity (area α3 in FIG. 7A) of the upper limit value (+Ilim) of the electric current detection.

Also, as shown in FIG. 7B, when the short anomaly occurs in any one of the respective FETs 18d, 18d, 18f of the low-voltage side (ground-side, upper end) of the drive circuit 18, the through-electric current having a value in the vicinity (area α4 in FIG. 7B) of the lower limit value (−Ilim) of the electric current detection is detected as the second electric current value Ix_lp of the phase with the anomaly detected by the electric current detector 21. At this time, the corresponding lower end FET is grounded and shorted, so that the first electric current value Ix_hp becomes theoretically substantially "0 (zero)". Hence, in this case, the phase electric current value Ix that is a difference between the two values indicates a value in the vicinity (area α3 in FIG. 7B) of the limit value (upper limit value: +Ilim) of the electric current detection.

That is, like this illustrative embodiment, when the respective electric current sensors 20u, 20v, 20w are provided at the low-voltage sides of the respective switching arms 18u, 18v, 18w, if the short anomaly occurs, the first electric current value Ix_hp (upon the upper end short) or second electric current value Ix_lp (upon the lower end short) indicates a value in the vicinity of the lower limit value (−Ilim) of the electric current detection.

Noticing the above point, the anomaly detector 25 of this illustrative embodiment determines whether the absolute values of the respective phase electric current values Iu, Iv, Iw detected by the electric current detector 21 exceed a third threshold value I3 that is set in correspondence to the limit value (±Ilim) of the electric current detection. Also, the anomaly detector 25 determines whether any one of the absolute values of the first electric current values Iu_hp, Iv_hp, Iw_hp and the second electric current values Iu_lp, Iv_lp, Iw_lp is smaller than a fourth threshold value I4 that is set in correspondence to the lower limit value (−Ilim) of the electric current detection. Also, in this illustrative embodiment, the fourth threshold value I4 has a negative symbol, like the lower limit value, and is set so that an absolute value thereof is smaller than the third threshold value I3. When there is a phase that fulfils both the two determination conditions, the anomaly detector determines that the short anomaly as described above has occurred in the corresponding phase.

Figure 8:
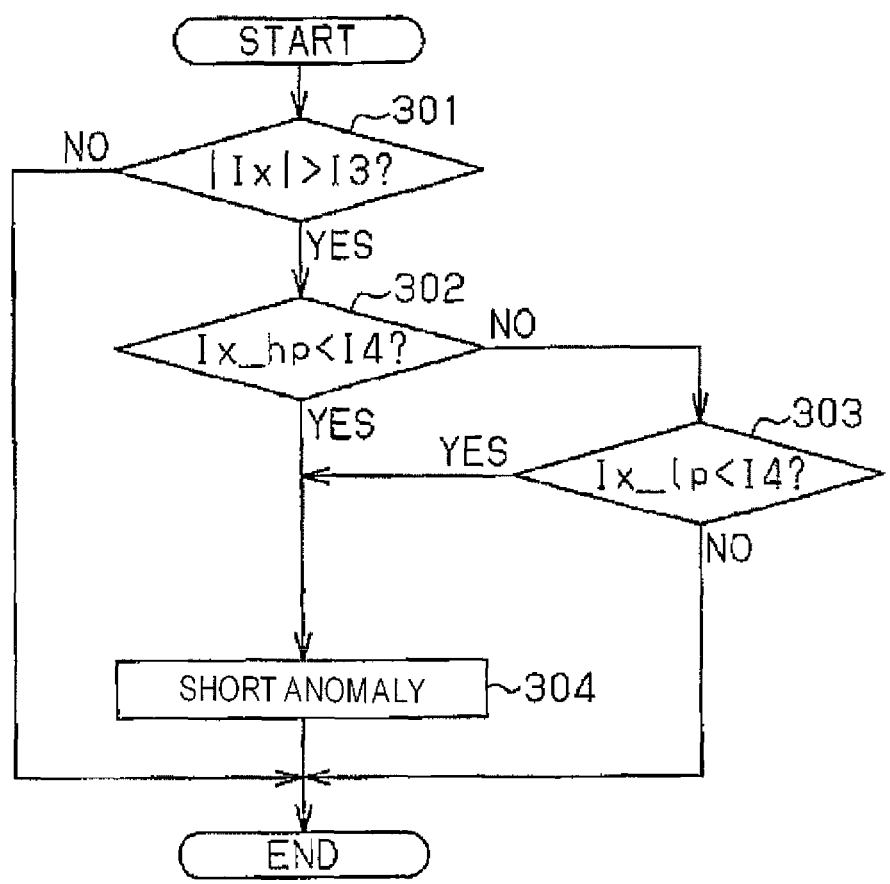
FIG. 8 is a flowchart showing a processing procedure of short anomaly detection.

Specifically, as shown in a flowchart of FIG. 8, the anomaly detector 25 of this illustrative embodiment first determines whether an absolute value (|Ix|) of the phase electric current value Ix of the X phase (X=U, V, W), which is a determination target, exceeds the third threshold value I3 (step 301).

Then, when it is determined in step 301 that the absolute value (|Ix|) of the phase electric current value Ix exceeds the third threshold value I3 (|Ix|>I3, step 301: YES), the anomaly detector 25 determines whether the first electric current value Ix_hp thereof is smaller than the fourth threshold value I4 (step 302). Also, when it is determined in step 302 that the first electric current value Ix_hp of the X phase is equal to or larger than the fourth threshold value I4 (Ix_lp≥I4, step 302: NO), the anomaly detector 25 continuously determines whether the second electric current value Ix_lp of the X phase is smaller than the fourth threshold value I4 (step 303). When it is determined in the two steps that the first electric current value Ix_hp is smaller than the fourth threshold value I4 (Ix_hp<I4: step 302: YES) or the second electric current value Ix_lp is smaller than the fourth threshold value I4 (Ix_lp<I4: step 302: YES), the anomaly detector determines that the short anomaly has occurred in the X phase (step 304).

Also, when it is determined in step 301 that the absolute value (|Ix|) of the phase electric current value Ix is equal to or smaller than the third threshold value I3 (|Ix|≤I3, step 301: NO), the anomaly detector 25 of this illustrative embodiment does not execute the processing of step 302 and thereafter. When it is determined in step 303 that the second electric current value Ix_lp is equal to or larger than the fourth threshold value I4 (Ix_lp≥I4, step 303: NO), the anomaly detector does not execute the processing of step 304.

Like this, the anomaly detector 25 of this illustrative embodiment executes the sensor anomaly determination processing (refer to FIG. 6, steps 201 to 204) and the short anomaly detection processing (refer to FIG. 8, steps 301 to 304) for each phase of U, V and W. The anomaly detector outputs the anomaly detection signal Str, which includes the results of the sensor anomaly detection and short anomaly detection, to the motor controller 22.

Also, in this illustrative embodiment, the motor controller 22 determines whether the anomaly detection signal Str input from the anomaly detector 25 indicates the occurrence of the sensor anomaly. When there is the sensor anomaly, the motor controller determines whether the sensor anomaly has occurred in only one phase, i.e., whether the two normal phases remain. When the anomaly detection signal Str indicates the occurrence of the sensor anomaly and the sensor anomaly has occurred in only one phase, the motor controller generates the motor control signal (continuous control) so as to continuously feed the drive power to the motor while using the two phases except for the phase with the sensor anomaly as an electric conductive phase, like the case where the electric conduction defect occurs.

Also, the motor controller 22 of this illustrative embodiment determines whether the anomaly detection signal Str input from the anomaly detector 25 indicates the occurrence of the short anomaly. When the anomaly detection signal Str indicates the occurrence of the short anomaly, the motor controller stops the motor control and quickly seeks the fail safe.

In the below, respective anomaly detections and aspects of the motor control depending on the anomaly modes, which are executed by the microcomputer 17 of this illustrative embodiment, are described.

Figure 9:
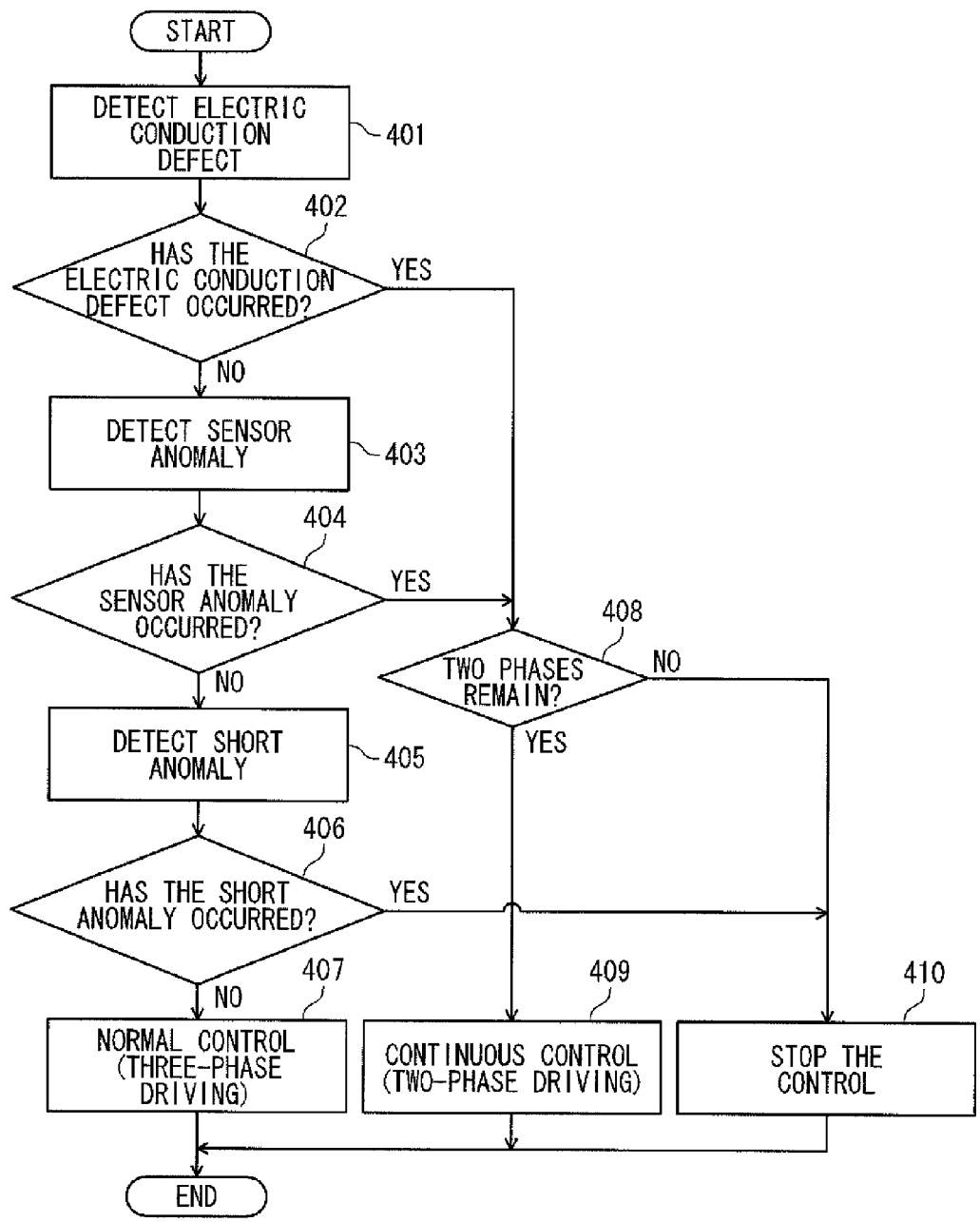
FIG. 9 is a flowchart showing respective anomaly detections and aspects of motor control depending on the anomaly modes.

As shown in a flowchart of FIG. 9, the microcomputer 17 of this illustrative embodiment first executes the electric conduction defect detection (step 401). When it is determined that the electric conduction defect has not occurred (step 402: NO), the microcomputer continues to execute the sensor anomaly detection (step 403, refer to FIG. 6). Also, when it is determined based on the result of the sensor anomaly detection that the sensor anomaly has not occurred (step 404: NO), the microcomputer 17 continues to execute the short anomaly detection (step 405, refer to FIG. 8). When it is determined based on the result of the short anomaly detection that the short anomaly has not occurred (step 406: NO), the microcomputer generates a motor control signal so as to feed the three-phase drive power to the motor 12 (normal control, step 407).

Also, when it is determined in step 402 that the electric conduction defect has occurred (step 402: YES) or when it is determined in step 404 that the sensor anomaly has occurred (step 404: YES), the microcomputer 17 determines whether the anomaly has occurred in only one phase, i.e., whether the two electric conductive phases remain (step 408). When the anomaly has occurred in only one phase (step 408: YES), the microcomputer generates the motor control signal so as to continuously feed the drive power to the motor 12 while using the two phases except for the phase with the anomaly as an electric conductive phase (continuous control, step 409).

When it is determined in step 406 that the short anomaly has occurred (step 406: YES) or when it is determined in step 408 that the two electric conductive phases do not remain (step 408: YES), the microcomputer 17 stops the motor control.

As described above, according to this illustrative embodiment, following operational effects can be obtained.

(1) The anomaly detector 25 determines whether at least one of the absolute values of the detected first electric current value Ix_hp and second electric current value Ix_lp exceeds the first threshold value I1 that is set in correspondence to the limit value (±Ilim) of the electric current detection. Also, the anomaly detector 25 determines whether the absolute values of the respective phase electric current values detected are smaller than the second threshold value I2 that is set in correspondence to "0 (zero)". When there is a phase that fulfils both the two determination conditions, the anomaly detector determines that the sensor anomaly (stiction anomaly) has occurred in the corresponding phase.

That is, when any anomaly occurs in the electric current sensors 20*u*, 20*v*, 20*w* of the respective phases, both the first electric current value Ix_hp and the second electric current value Ix_lp of the phase with the anomaly may be constant as the values close to the limit value (±Ilim) of the electric current detection. In this case, the phase electric current value Ix, which is a difference of the two values, is also constant as a value close to "0".

Therefore, according to the above configuration, it is possible to detect whether the sensor anomaly has occurred in each phase with good precision. Then, it is possible to execute the continuous control by the two-phase driving, based on the detection result, thereby continuing to provide the assist force to the steering system while securing the safety. As a result, it is possible to reduce the driver's burden by suppressing the increase in the steering force after the anomaly has occurred.

(2) The anomaly detector 25 determines whether the absolute value of the detected phase electric current value Ix exceeds the third threshold value I3 that is set in correspondence to the limit value (±Ilim) of the electric current detection. Also, the anomaly detector 25 determines whether each first electric current value Ix_hp or each second electric current value Ix_lp detected is smaller than the fourth threshold value I4 that is set in correspondence to the lower limit value (−Ilim) of the electric current detection. When there is a phase that fulfils both the two determination conditions, the anomaly detector determines that the short anomaly has occurred in the corresponding phase.

That is, when the respective electric current sensors 20*u*, 20*v*, 20*w* are provided at the low-voltage sides of the respective switching arms 18*u*, 18*v*, 18*w* configuring the drive circuit 18, if the short anomaly occurs, the first electric current value Ix_hp (upon the upper end short) or second electric current value Ix_lp (upon the lower end short) indicates a value in the vicinity of the lower limit value (−Ilim) of the electric current detection.

Therefore, according to the above configuration, it is possible to detect whether the short anomaly has occurred in each phase with good precision. Based on the detection result, it is possible to stop the motor control and to rapidly seek the fail safe, thereby further improving the safety thereof.

Also, the above illustrative embodiment can be modified as follows. In the above illustrative embodiment, the invention has been implemented as the ECU 11 that is the motor control device controlling the operations of the motor 12, which is the driving source of the EPS actuator 10. However, the invention is not limited thereto and can be also applied to utilities other than the EPS.

Also, the type of the EPS is not limited to the so-called column type and may be a so-called pinion type or rack assist type.

In the above illustrative embodiment, when the occurrence of the short anomaly is confirmed by the short anomaly detection shown in FIG. 8, the motor control is stopped. However, the invention is not limited thereto. For example, the motor control may be stopped when the absolute value of the phase electric current value Ix exceeds a threshold value indicating that over-current has occurred. Also, the threshold value of this case may be set in correspondence to the limit value (±Ilim) of the electric current detection, like the first and third threshold values.

Also, regarding the sensor anomaly detection, when any one of the output signals Si_u, Si_v, Si_w of the respective electric current sensors 20*u*, 20*v*, 20*w* indicates an electric conduction state at a state where all the FETs 18*a* to 18*f* configuring the drive circuit 18 are off, a determination may be made that the sensor anomaly has occurred in a corresponding phase.

Specifically, for example, the short anomaly detection shown in FIG. 8 is first executed. Then, at a state where the motor control is stopped based on the detection result, i.e., all the FETs 18*a* to 18*f* are off, the sensor anomaly detection may be executed based on the output signals Si_u, Si_v, Si_w of the respective electric current sensors 20*u*, 20*v*, 20*w*.

The first threshold value I1 and third threshold value I3 corresponding to the limit value (±Ilim) of the electric current detection are not necessarily the same as the limit value and may be arbitrarily set, considering a detection error and the like. The fourth threshold value I4 corresponding to the lower limit value (−Ilim) of the electric current detection is also the same and the second threshold value I2 corresponding to "0 (zero)" may be not necessarily "0".

Also, the short anomaly determination based on the terminal voltage of the anomaly phase may be executed after the sensor anomaly detection shown in FIG. 6 and at the state where all the respective FETs 18*a* to 18*f* configuring the drive circuit 18 are off. That is, a full-up resistance is connected to the power feeding lines 26*u*, 26*v*, 26*w*, so that a terminal voltage based on the power supply voltage is detected in the corresponding phase upon the short anomaly even when all the respective FETs 18*a* to 18*f* are off. Therefore, after the sensor anomaly is detected, the short of each FET in the corresponding phase is denied in the short anomaly determination, so that the reliability of the sensor anomaly detection can be improved. A series of the determinations are repeated several times, so that it is possible to detect whether the sensor anomaly has occurred with better precision.

In the below, the technical spirits that can be perceived from the above illustrative embodiment are described.

(A) When the short anomaly occurs, the motor control signal output means does not output the motor control signal in which two phases other than the phase with the anomaly are used as an electric conductive phase. Thus, it is possible to rapidly seek the fail safe, thereby further improving the safety.

(B) The fourth threshold value is set so that the absolute value thereof is smaller than that of the third threshold value. That is, the comparison of the fourth threshold value and the first and second electric current values is performed so as to determine whether the through-electric current has occurred, and the positioning thereof is to decide a direction of the electric conduction because the over-current detection based on the phase electric current values is separately performed. Hence, according to the above configuration, it is possible to exclude an influence of the detection error, thereby improving the precision of the short anomaly detection.

Although the invention has been specifically described with reference to the specific illustrative embodiment, it is apparent to one skilled in the art that a variety of changes and modifications can be made without departing from the spirit and scope of the invention.

This application is based on Japanese Patent Application No. 2011-001203 filed on Jan. 6, 2011, the disclosures of which are incorporated herein by reference.

INDUSTRIAL APPLICABILITY

According to the invention, it is possible to provide the motor control device and electric power steering device capable of detecting whether the sensor anomaly has occurred with good precision while distinguishing the sensor anomaly with the short anomaly having occurred in each switching element configuring the drive circuit.

REFERENCE SIGNS LIST

1: electric power steering device (EPS)
10: EPS actuator
11: ECU
12: motor
12u, 12v, 12w: motor coil
17: microcomputer
18: drive circuit
18a to 18f: FET
18u, 18v, 18w: switching arm
20u, 20v, 20w: electric current sensor
21: electric current detector
22: motor controller
25: anomaly detector
26u, 26v, 26w: power feeding line
Si_u, Si_v, Si_w: output signal
Iu_hp, Iv_hp, Iw_hp, Ix_hp: first electric current value
Iu_lp, Iv_lp, Iw_lp, Ix_lp: second electric current value
Iu, Iv, Iw, Ix: phase electric current value
I1, I2, I3, I4: threshold value
Ilim: limit value (upper limit and lower limit)
Str: anomaly detection signal
δ1, δ2: triangular wave

The invention claimed is:

1. A motor control device comprising:
an electric current detection means that detects phase electric current values of three phases to be electrically conducted to a motor;
a motor control signal output means that outputs a motor control signal by executing electric current control, in which a triangular wave is a PWM carrier, based on the respective phase electric current values; and
a drive circuit that outputs drive power to the motor, based on the motor control signal,
wherein the drive circuit is configured by parallel connecting switching arms in correspondence to the respective phases, each of the switching arms having a pair of switching elements turning on/off on the basis of the motor control signal and connected in series with each other,
wherein electric current sensors are provided to low-voltage sides of the respective switching arms,
wherein the electric current detection means detects first electric current values of the respective phases by acquiring output signals of the respective electric current sensors at timing at which the triangular wave becomes a peak, detects second electric current values of the respective phases by acquiring output signals of the respective electric current sensors at timing at which the triangular wave becomes a bottom, and detects phase electric current values of the respective phases based on differences of the respective first electric current values and the respective second electric current values,
wherein an anomaly detection means that detects an anomaly occurring on power feeding paths of the respective phases on the basis of the first electric current values, the second electric current values and the phase electric current value is provided, and
wherein when at least one of an absolute value of the first electric current value and an absolute value of the second electric current value exceeds a first threshold value corresponding to a limit value of the electric current detection and an absolute value of the phase electric current value is smaller than a second threshold value corresponding to zero in any one phase, the anomaly detection means determines that an anomaly of the electric current sensor has occurred as regards the corresponding phase.

2. The motor control device according to claim 1, wherein when the anomaly of the electric current sensor has occurred, the motor control signal output means outputs the motor control signal in which two phases other than the phase with the anomaly are used as an electric conductive phase.

3. The motor control device according to claim 1, wherein when the absolute value of the phase electric current value exceeds a third threshold value corresponding to the limit value and the first electric current value or second electric current value is smaller than a fourth threshold value corresponding to a lower limit value of the electric current detection, the anomaly detection means determines that a short anomaly of the switching element has occurred as regards the corresponding phase.

4. An electric power steering device comprising the motor control device according to claim 1.

* * * * *